United States Patent
Vasseur et al.

(10) Patent No.: US 8,654,649 B2
(45) Date of Patent: Feb. 18, 2014

(54) REDUCED TOPOLOGY ROUTING IN SHARED MEDIA COMMUNICATION NETWORKS

(75) Inventors: Jean-Philippe Vasseur, Saint Martin d'Uriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 13/191,840

(22) Filed: Jul. 27, 2011

(65) Prior Publication Data
US 2013/0028143 A1 Jan. 31, 2013

(51) Int. Cl.
*G01R 31/08* (2006.01)

(52) U.S. Cl.
USPC .......................................... 370/238; 370/255

(58) Field of Classification Search
USPC ................ 370/351, 380, 389, 400, 408, 237;
379/221.01; 340/2.23
See application file for complete search history.

(56) References Cited

U.S. PATENT DOCUMENTS

| | | | |
|---|---|---|---|
| 7,496,078 B2 | 2/2009 | Rahman | |
| 7,567,822 B2 | 7/2009 | Hart et al. | |
| 7,675,860 B2 * | 3/2010 | Vasseur et al. | 370/237 |
| 7,706,345 B2 | 4/2010 | Meier et al. | |
| 7,720,010 B2 | 5/2010 | Ribiere et al. | |
| 7,860,025 B2 | 12/2010 | Thubert et al. | |
| 7,899,027 B2 | 3/2011 | Castagnoli et al. | |
| 7,903,573 B2 | 3/2011 | Singer et al. | |
| 7,984,137 B2 | 7/2011 | O'Toole, Jr. et al. | |
| 2002/0186665 A1 * | 12/2002 | Chaffee et al. | 370/255 |
| 2009/0092112 A1 * | 4/2009 | Kim et al. | 370/338 |
| 2009/0147714 A1 * | 6/2009 | Jain et al. | 370/311 |
| 2010/0157838 A1 * | 6/2010 | Vaswani et al. | 370/252 |
| 2010/0260177 A1 * | 10/2010 | Wu et al. | 370/389 |

OTHER PUBLICATIONS

Cipolla, et al., "Notification of Transmittal of the International Search Report and the Written Opinion of the International Searching Authority, or the Declaration", Patent Cooperation Treaty, Nov. 7, 2012, 12 pages, PCT/US2012/048530, European Patent Office, Rijswijk, Netherlands.
"RPL: IPv6 Routing Protocol for Low Power and Lossy Networks" <draft-ietf-roll-rpl-19> by Winter, at al. (Mar. 13, 2011 version).

(Continued)

*Primary Examiner* — Anh-Vu Ly
*Assistant Examiner* — Gustavo Lopez-Vargas
(74) *Attorney, Agent, or Firm* — Edwards Wildman Palmer LLP; James M. Behmke; Stephen D. LeBarron

(57) ABSTRACT

In one embodiment, a particular node in a shared communication network determines a current path cost in a routing topology from itself to a root node via a current parent node. The particular node also determines a respective path cost from each reachable potential parent node of the particular node to the root node via each potential parent and a respective link metric to each potential parent node. A set of acceptable parent nodes are determined from the potential parent nodes that have a respective path cost that is less than the current path cost plus an acceptable cost increase, and also have a respective link metric that is within an acceptable range. By determining a respective number of child nodes for each acceptable parent node, the particular node may then select a new parent node based on giving preference to those having a greater respective number of child nodes.

24 Claims, 11 Drawing Sheets

(56) References Cited

OTHER PUBLICATIONS

"Routing Metrics used for Path Calculation in Low Power and Lossy Networks" <draft-ietf-roll-routing-metrics-19> by Vasseur, et al. (Mar. 1, 2011 version).

"RPL Objective Function 0" <draft-ietf-roll-of0-15> by Thubert (Jul. 8, 2011 version).

"The Minimum Rank Objective Function with Hysteresis" <draft-ietf-roll-minrank-hysteresis-of-04> by O. Gnawali et al. (May 17, 2011 version).

\* cited by examiner

REDUCED TOPOLOGY ROUTING IN SHARED MEDIA COMMUNICATION NETWORKS

TECHNICAL FIELD

The present disclosure relates generally to communication networks, and, more particularly, to routing topologies in shared media communication networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

A typical urban deployment can exhibit a very dense layout, where the number of is smart objects (e.g., meters) acting as routers within physical proximity can be very large. Although such routing topologies exhibit interesting properties in terms of resiliency, there are also a number of undesirable effects:

1) Such routing topologies can lead to excessive routing control traffic. If all nodes act as routers, they must all participate in the routing protocol (e.g., advertising path costs, etc.);

2) Dense routing topologies can increase the convergence time of a routing protocol, because routing state must propagate through a larger number of nodes;

3) Having a large number of independent sender-receiver pairs communicating simultaneously can increase contention and reliance on medium access techniques to resolve contention;

4) Path length can be higher thus increasing the networking delays; and

5) These above factors can consume energy on more nodes than necessary, which is problematic especially when nodes are battery operated.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
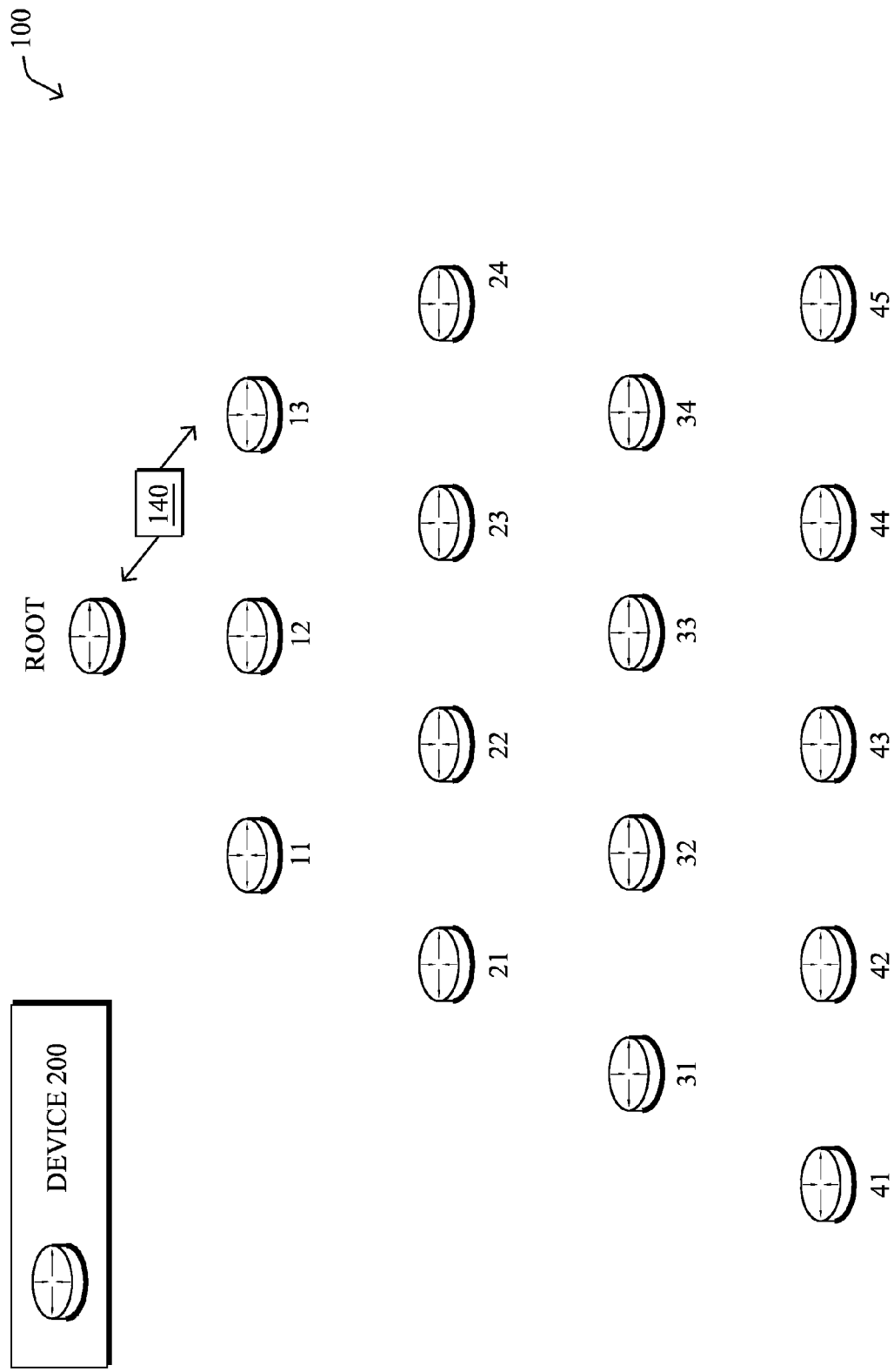
FIG. 1 illustrates an example communication network.

According to one or more embodiments of the disclosure, a particular node in a shared communication network determines a current path cost in a routing topology from the particular node to a root node of the routing topology via a current parent node. The particular node also determines, for each reachable potential parent node of the particular node, a respective path cost from the particular node to the root node via each potential parent and a respective link metric from the particular node to each potential parent node. A set of acceptable parent nodes selected from the potential parent nodes may then be determined, where acceptable parent nodes have a respective path cost that is less than the current path cost plus an acceptable cost increase, and also have a respective link metric from the particular node that is within an acceptable link metric range. By determining, for each acceptable parent node of the set, a respective number of child nodes of the corresponding acceptable parent node, the particular node may then select a new parent node based on giving preference to acceptable parent nodes having a greater respective number of child nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links between nodes (not shown) may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
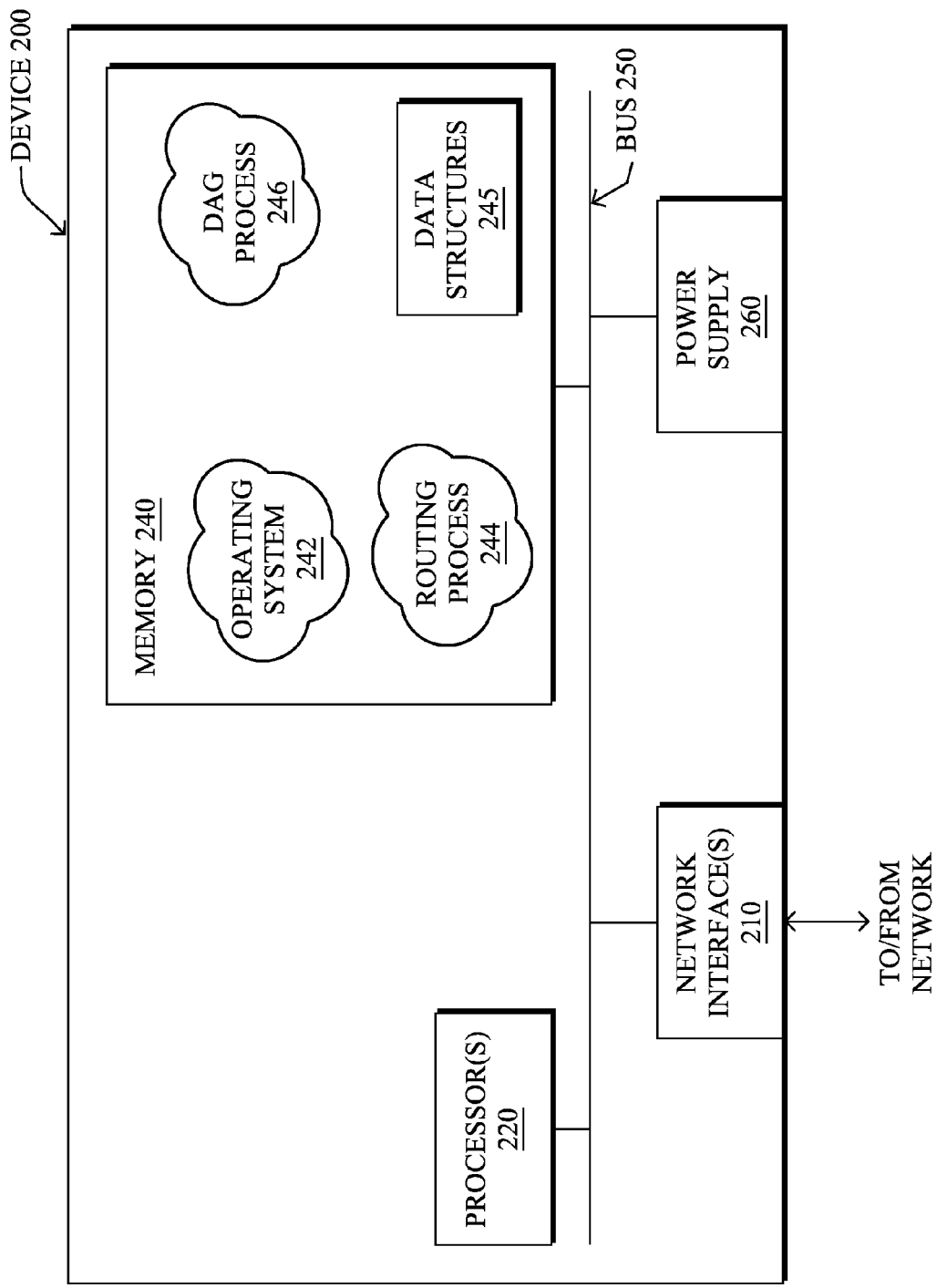
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative directed acyclic graph (DAG) process 246, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-15> by Thubert (Jul. 8, 2011 version) and "The Minimum Rank Objective Function with Hysteresis"<draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
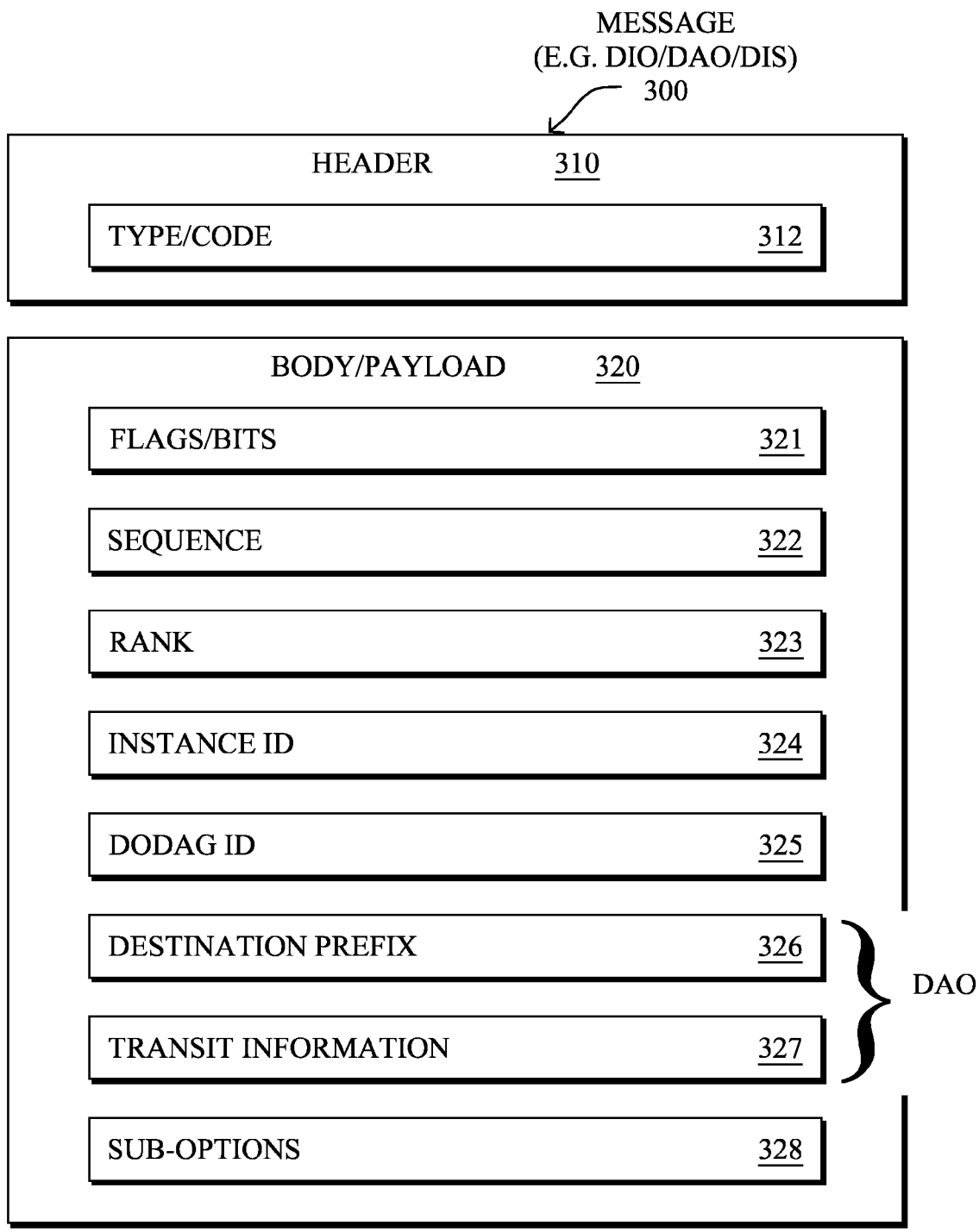
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
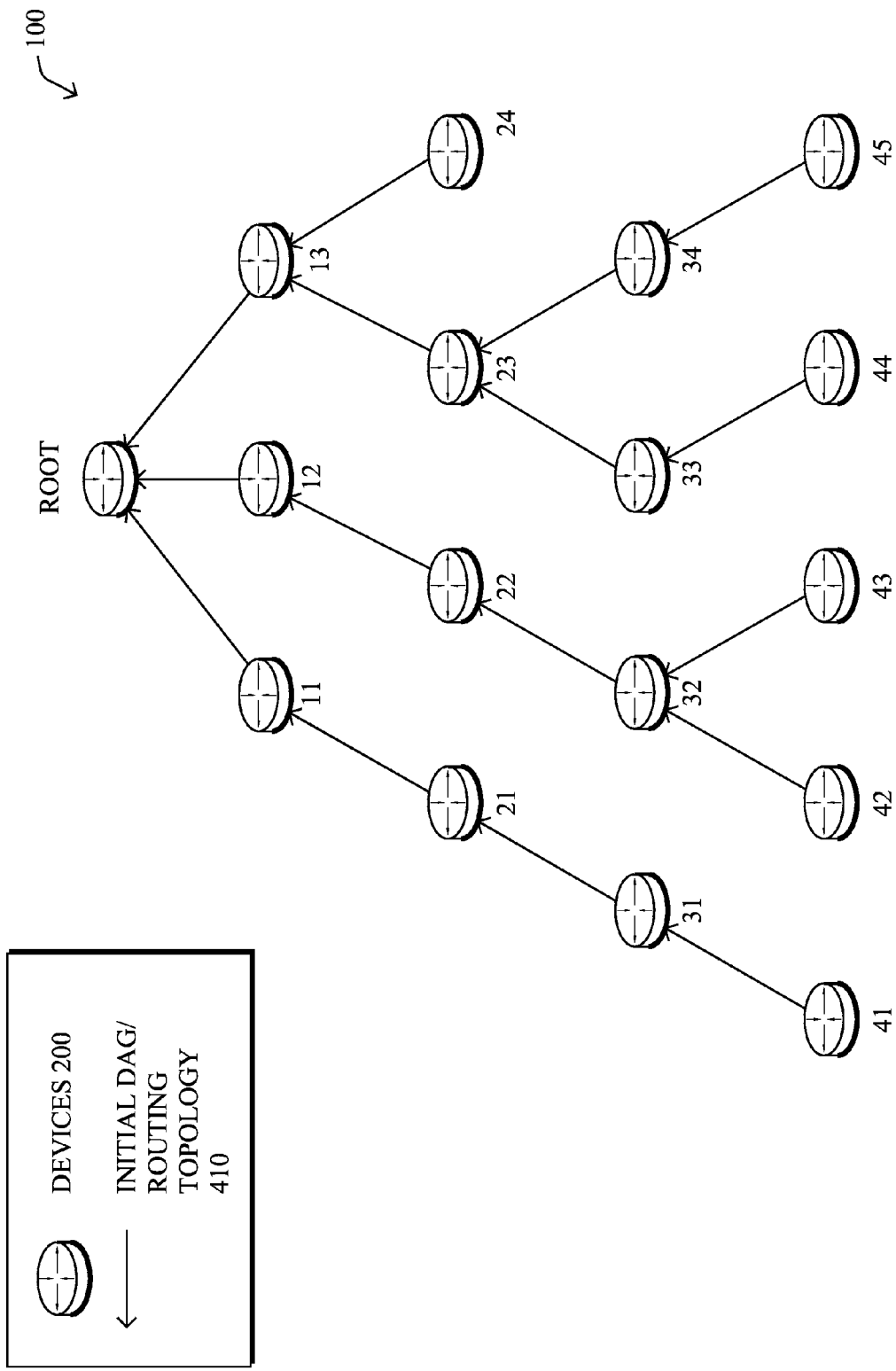
FIG. 4 illustrates an example routing topology (e.g., a directed acyclic graph or "DAG"), in the communication network of FIG. 1.

FIG. 4 illustrates an example simplified DAG that may be created, e.g., through the techniques described above, within network 100 of FIG. 1. For instance, certain links may be selected for each node to communicate with a particular parent (and thus, in the reverse, to communicate with a child, if one exists). These selected links form the DAG 410, which extends from the root node toward one or more leaf nodes or "hosts" (nodes without children). Traffic/packets 140 (shown in FIG. 1) may then traverse the DAG 410 in either the upward direction toward the root or downward toward the leaf nodes, particularly as described herein.

As noted above, a typical urban deployment can exhibit a very dense layout, where the number of smart objects (e.g., meters) acting as routers within physical proximity can be very large. Although such routing topologies exhibit interesting properties in terms of resiliency, there are also a number of undesirable effects:

1) Such routing topologies can lead to excessive routing control traffic. If all nodes act as routers, they must all participate in the routing protocol (e.g., advertising path costs, etc.);

2) Dense routing topologies can increase the convergence time of a routing protocol, because routing state must propagate through a larger number of nodes; and 3) Having a large number of independent sender-receiver pairs communicating simultaneously can increase contention and reliance on medium access techniques to resolve contention;

4) Path length can be higher thus increasing the networking delays; and

5) These above factors can consume energy on more nodes than necessary, which is problematic especially when nodes are battery operated.

Instead, reducing the number of forwarding devices can help alleviate channel contention since fewer pairs of nodes are contending for the channel at the same time. As described below, therefore, the routing topology may be optimized according to one or more techniques herein so as to alleviate (or at least significantly reduce) the aforementioned downside effects, while still providing acceptable quality paths.

Before describing the techniques herein, it is worth mentioning why a node may not always connect to routers that are the closest to the root node in conventional technologies. Considering the topology of FIG. 1, suppose that node 32 receives a routing protocol control packet (e.g., a DIO in the case of RPL) from both the nodes 13 and 22. Even if node 13 is closer to the root, node 13 may choose node 22 as its preferred next hop (parent), since the advertised path costs and computed local link metrics may determine that node 22 is the preferred parent. A simplified approach could consist of using the number of hops as a routing metrics. Unfortunately, this does not solve the issue and such an approach presents drawbacks: (1) This may reduce the number of hops for some paths, but not the number of active routers (see below for a description of active routers); and (2) In most cases, it is useful to keep track of various path metrics, such as the path ETX (path reliability), thus using the routing metrics (e.g., ETX) may be a requirement for certain networks.

Reduced Topology Routing

The techniques herein compute a routing topology by illustratively initially selecting a best path according to some metrics. Based on a current topology, nodes may try to select another next-hop that would need not provide the best path, but instead an "acceptable" path (e.g., according to a network management system, "NMS") in order to reduce the number of children for specific nodes, potentially relinquishing the need for certain nodes to act as routers in the network, thus reducing the routing topology (i.e., reducing the number of routers in the topology).

Specifically, according to one or more embodiments of the disclosure as described in detail below, a particular node in a shared communication network determines a current path cost in a routing topology from the particular node to a root node of the routing topology via a current parent node. The particular node also determines, for each reachable potential parent node of the particular node, a respective path cost from the particular node to the root node via each potential parent and a respective link metric from the particular node to each potential parent node. A set of acceptable parent nodes selected from the potential parent nodes may then be determined, where acceptable parent nodes have a respective path cost that is less than the current path cost plus an acceptable cost increase, and also have a respective link metric from the particular node that is within an acceptable link metric range. By determining, for each acceptable parent node of the set, a respective number of child nodes of the corresponding acceptable parent node, the particular node may then select a new parent node based on giving preference to acceptable parent nodes having a greater respective number of child nodes. Accordingly, certain nodes that have no children may operate in a "host" mode, rather than acting in a "router" mode, therefore reducing the routing topology in the communication network.

Illustratively, the techniques described herein may be performed by hardware, software, and/or firmware, such as in accordance with the DAG process 246, which may contain computer executable instructions executed by the processor 220 to perform functions relating to the novel techniques described herein, e.g., in conjunction with routing process 244. For example, the techniques herein may be treated as extensions to conventional routing protocols, such as RPL, and as such, may be processed by similar components understood in the art that execute those protocols, accordingly. Note that while the description is generally based on DAGs and the RPL protocol, it is expressly noted herein that the use of DAGs and RPL is merely an illustrative example, and the techniques herein may be applied to any suitable routing topology protocol with selected next-hop nodes (e.g., parents), and the ability (e.g., and desire) to have certain nodes within the topology act as hosts instead of routers, as described herein.

Operationally, an "acceptable quality path" is defined based on both a path cost and one or more link metrics. In particular, according to the techniques herein, a node can determine whether or not a link metric from itself to each potential parent node is acceptable using an acceptable link metric range or threshold, as described below. For example, various metrics may be used, such as ETX, delay, packet loss, etc, where for certain metrics, the threshold may be an upper and/or lower bound (e.g., an absolute value or a percentage). For instance, in the case of ETX, the threshold would be a maximum bound on the ETX value since larger ETX values indicate a lower quality link. In addition, for the path cost, a node determines whether or not increasing the cost from the particular node to the root node via each potential parent to achieve other goals is acceptable using a threshold called an acceptable cost increase (ACI). Note that in certain embodiments, the ACI may be based on the corresponding link metric, such as a different ACI based on delay than another ACI based on ETX, etc. As described in detail below, nodes may then determine a set of acceptable parent nodes (selected from reachable potential parent nodes) that have a respective path cost that is less than a current path cost plus the acceptable cost increase, and also that have a respective link metric from the particular node that is within the acceptable link metric range. Further, in addition to (or as an alternative to) the ACI, a maximum path cost may be defined to limit acceptable path costs to the root node (e.g., that nodes should never exceed if possible).

Note that in one embodiment, the link metric threshold and ACI (and maximum path cost) can be determined by a centralized management device (e.g., a network management system or "NMS") and propagated to (and thus shared by) nodes within the network, for example, using routing control plane messages (e.g., DIO messages in RPL), IPv6 multicast communication, etc. In another embodiment, the link cost threshold and ACI may be configured out-of-band on individual devices. In yet another embodiment, the link cost threshold and ACI may be adaptively adjusted using a local algorithm executing on each individual devices. In other words, a particular node may locally and dynamically determine at least one of either the acceptable cost increase and the acceptable link metric range itself, e.g., taking into account a number of neighbors of the particular node, a number of children of the particular node, dynamic link characteristics of the particular node, etc.

According to one or more embodiments herein, an illustrative first step comprises an initialization phase, where a routing topology is initialized/established using the link metric of interest (e.g., ETX) with no attempt to reduce the number of active routers, i.e., without regard to numbers of child nodes. From this initial routing topology, parent node selection may be iteratively updated by selecting new parent nodes based on giving preference to acceptable parent nodes having a greater respective number of child nodes, e.g., as the routing topology is updated (e.g., by other nodes performing the same function), accordingly.

In particular, routing topology adaptation during such iterative updates (e.g., a procedure called every X minutes) may attempt to trade the path quality for the reduction of the number of active routers in the network. First, a particular node, e.g., node 32, may evaluate/determine a current path cost from itself to a root node via a current parent node, such as node 22 as shown in FIG. 4.

Figure 5:
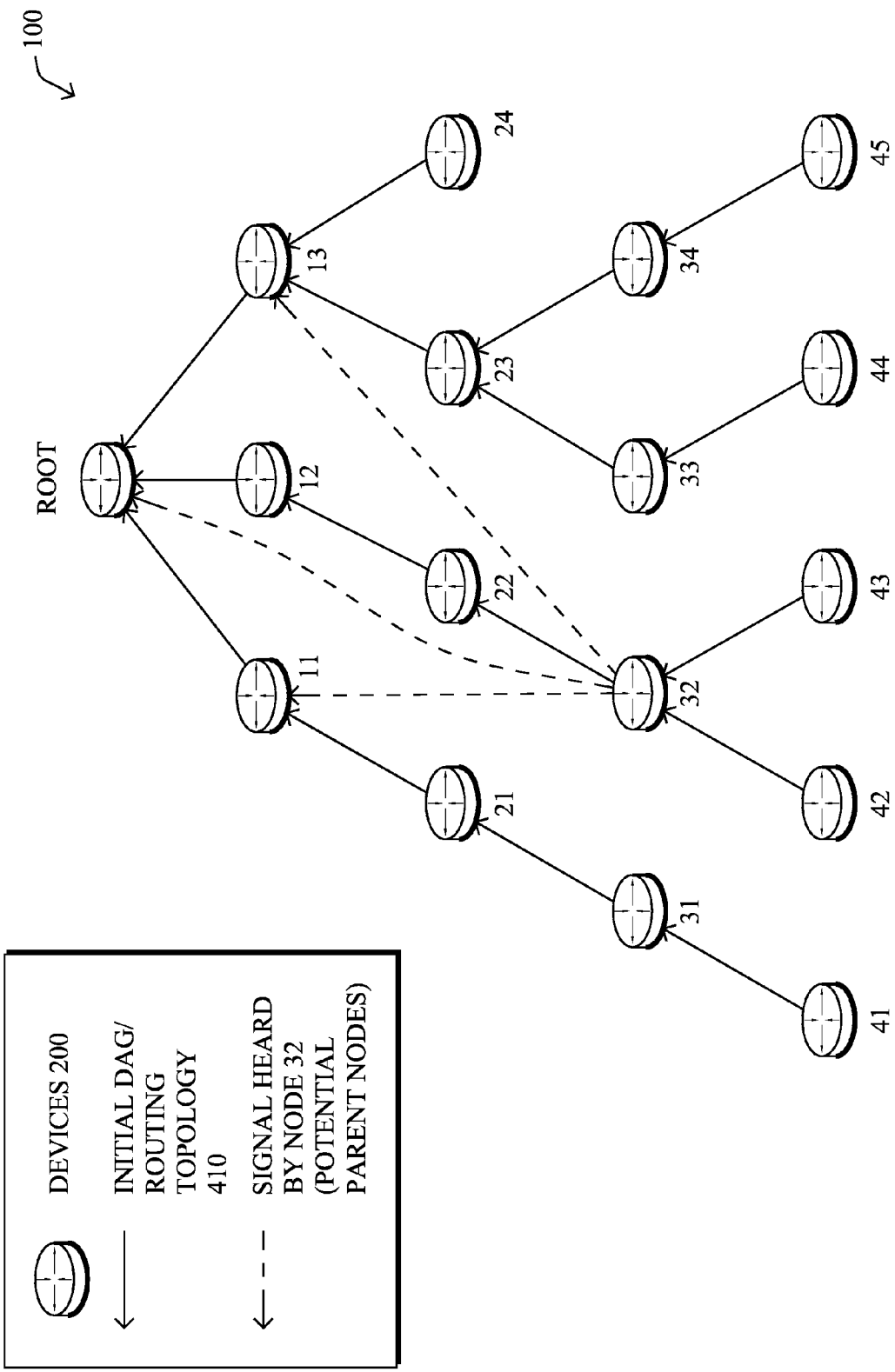
FIG. 5 illustrates an example of reachable potential parent nodes in the communication network.

As shown in FIG. 5, suppose that the node 32 illustratively hears routing protocol control packets from the root node, node 11, and node 13 (dashed arrows), each one being a potential parent node. Note that while the terms "parent node" and "child node" are used herein, these terms need not be tied to any particular protocol (e.g., RPL). Instead, the terms are used herein to imply a next-hop node to a destination, and any node using the particular node as a next-hop node to reach the destination, respectively.

The particular node (node 32) may then determine a path cost associated with reaching the root node via each potential parent node, should that potential parent node be selected as a new best next-hop in the routing topology. In addition, the link metric from the node to the potential parent node may also be determined (though may already be known based on the current topology as being a neighbor node, e.g., if there is sufficient memory to store such information on the particular node).

According to the techniques herein, then, if the path cost of a potential parent node is less than the current path cost plus the acceptable cost increase value (ACI), and also if the link metric to the potential parent node is less than the link metric threshold (i.e., is within the acceptable link metric range), then the potential parent node may be added to a set/list of acceptable candidate parent nodes. Suppose, for example, that the signal from the root node is too weak, and thus only node 11 and node 13 are added to the candidate list, i.e., they passed the "test" on path cost increase (ACI), link metric range, and, inherently (as potential parents) have a lower number of hops to the destination than the current parent node 22.

For each acceptable parent node of the candidate list, or alternatively for each potential parent node prior to determining acceptable parents, the node (node 32) can determine a current number of nodes using the respective acceptable parent node as their next-hop/parent, i.e., the number of child nodes (or "children"). Note that various messages, e.g., extensions carried in the DIO, may be used to report the number of active child nodes.

Assuming that the candidate list is not empty, then a new parent node may be selected based on giving preference to acceptable parent nodes having a greater respective number of child nodes. For instance, in the illustrative embodiment, the selection is made such that the number of children for the newly selected parent node is the greatest among any other acceptable parent in the candidate list. In the example in FIG. 5 above, node 32 may select node 13 since it has the highest number of child nodes, e.g., two child nodes, as opposed to one for node 11. Note that as an alternative embodiment, the number of child nodes may be based on any node "below" the parent node (children, grandchildren, etc.), such as comparing the six "child" nodes below node 13 to the three "child" nodes below node 11.

Note further that other conditions could be used during the selection process of a new parent, such as giving preference to acceptable parent nodes based on their associated capabilities. For instance, example capabilities may comprise being powered by main-power (e.g., "plugged in"), having sufficient battery power remaining, being capable of performing data aggregation, having sufficient processing capacity, having sufficient available memory, etc., which may be determined through various advertisement protocols (e.g., DIO messages).

In this manner, the techniques herein select a new next hop that offers an acceptable path cost (the path cost increase is acceptable), that does not violate any link metric restrictions, and that has the maximum number of children, which as described below may free other nodes without children to become "hosts." That is, the end result is that the path quality is still acceptable (perhaps not the "best" quality, but the objective function is different here), and since all nodes may be configured to run the same algorithm, several nodes in the network may end up with no children. At this point, these nodes without children turn off their router capability, thus becoming a host (not forwarding any traffic, or routing control plane messages such as DIO messages in the case of RPL, etc.). Accordingly, the number of active routers may be reduced, thus contributing to traffic reduction, less collision in the network, etc., and the nodes that become hosts instead of routers may thus saving energy (e.g., node 22).

In one or more additional embodiments herein, before effectively selecting the new preferred next hop (new parent), the node may inform its children (e.g., nodes 42 and 43) of the potential new (increased) path cost to the destination (e.g., using a newly defined routing object). If more than a threshold amount of nodes replies with a feed-back to the node indicating that selecting a new parent would lead to an unacceptable path for them (especially if they do not have any alternative), then the decision can be cancelled, otherwise the next hop change become operational.

As mentioned, there are often times when child nodes have no alternative parent nodes. Accordingly, in one or more embodiments herein, if a child node has a single option for a parent, then that single option parent must assume the role of a parent. That is, a parent node may determine that it must be a parent for at least one particular node, then it may advertise an indication of this into the network. Any node that receives this indication may take this into consideration when selecting their parent nodes. Alternatively, a "mandatory" parent may be configurable, such as being "mandatory" because it is a node with high computational power, is not battery operated (e.g., is "main-powered," etc.). The fact that a parent node must be a parent for another node is a strong reason to select that node as a parent, since that node will always be a parent in the routing topology. Hence, this factor may also be used when selecting between acceptable parent nodes.

According still to one or more embodiments herein, another component of the techniques consists of turning router functionality "on," e.g., should a node become disconnected without any alternate next hop. In this case, upon determining that the particular node can reach only host nodes in the routing topology, the disconnected node would send an alert message using a link-local multicast message (e.g., a new RPL DIS message). All potential routers receiving such an alert message (i.e., host nodes that can act as routers) may reply, for example, after the expiration of a dynamic timer that is inversely proportional to their path cost and number of hops to the destination (e.g., distance to the root node), so as to encourage expanding the routing topology by activating routers closer to the root. The disconnected node may then select a particular host node, now acting as a router, from which a reply/notification is received first as its new parent node. Note that the activation of a node as a router may have some impact on the routing topology, e.g., the newly activated router becoming more attractive to other routers.

Figure 6:
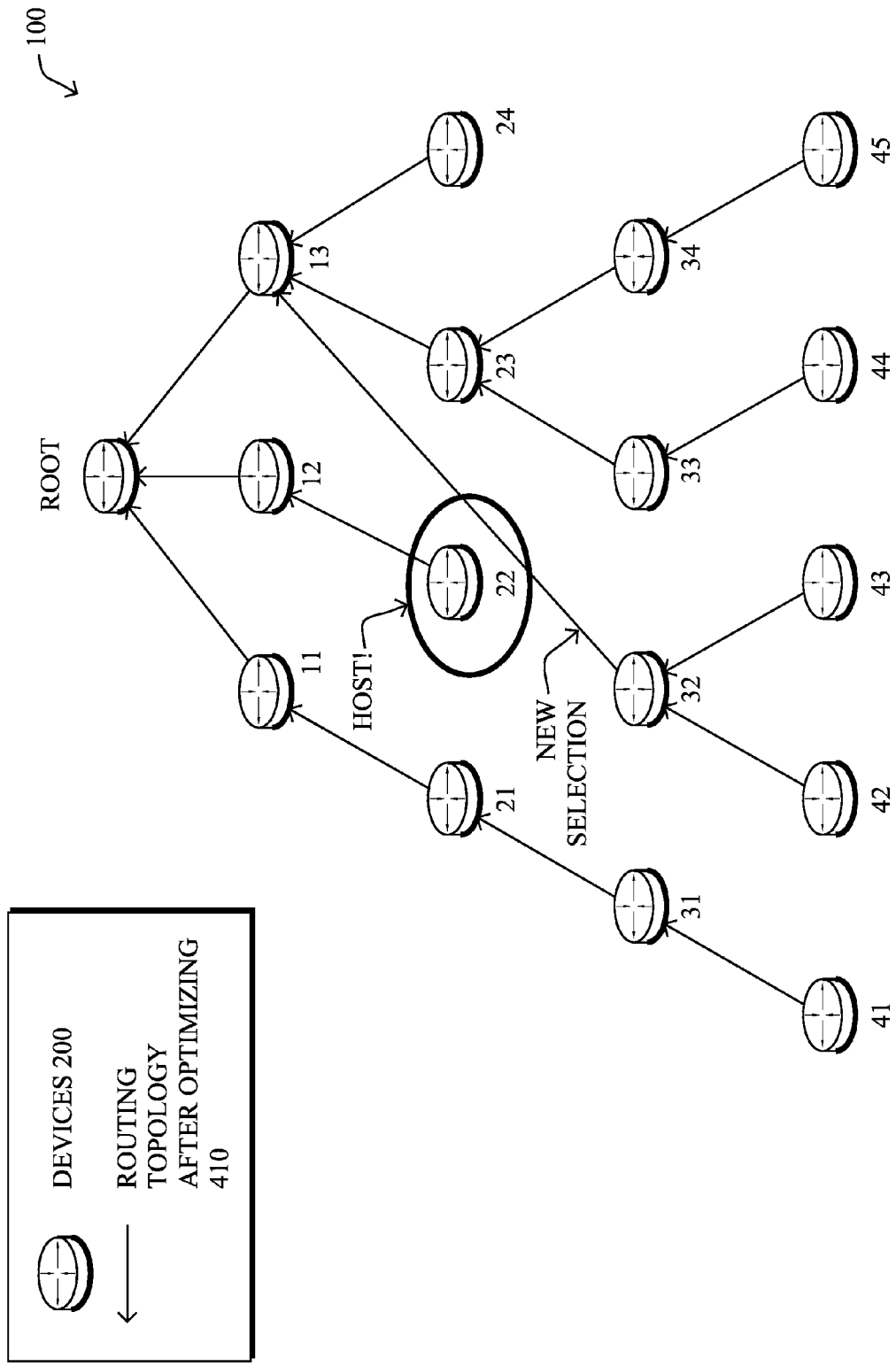
FIG. 6 illustrates an example of an updated routing topology (e.g., DAG) based on reduced topology routing.

Note further that in one or more embodiments herein, it may be possible to adjust the particular number of child nodes that is advertised, thus "weighting" the advertising node. For example, to increase the "pull" of a particular node in the network, a phantom number of child nodes may be added to the actual number, such that more child nodes could be attracted to the weighted node. (In the alternative, to reduce the number of attracted child nodes, this adjusted value could be a reduction, i.e., advertising fewer child nodes.) For example, as shown in FIG. 6, node 11 could advertise ten children if it wanted to influence its use as a parent node, or else may advertise zero children (or generally less than it has) to reduce the chances that it is used as a parent. This might be an appealing approach with nodes with high computational capabilities and/or available energy (e.g. nodes that are not battery powered), or for fewer child nodes, nodes that are less capable.

Figure 7:
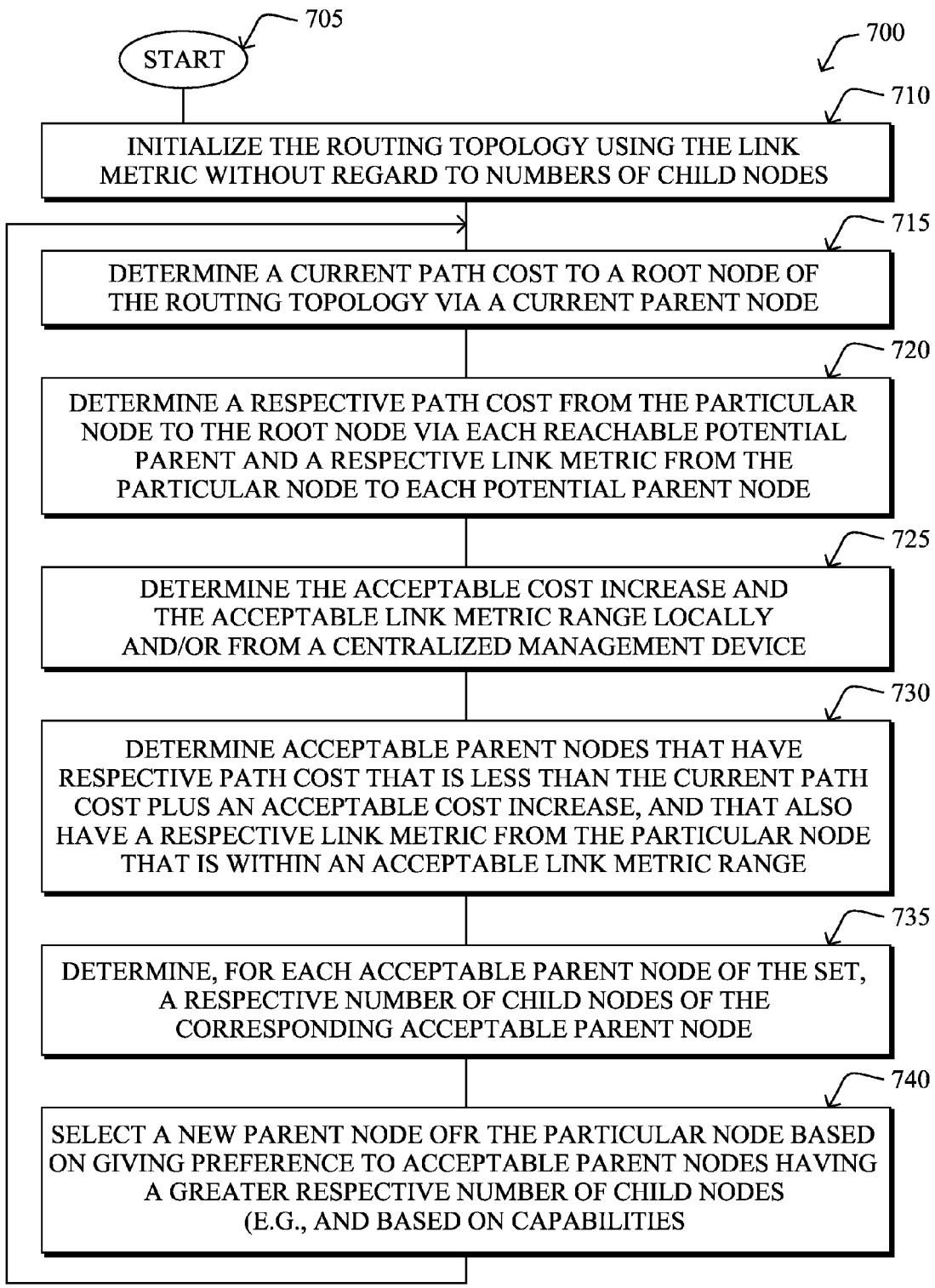
FIG. 7 illustrates an example simplified procedure for reduced topology routing in a shared-media communication network.

FIG. 7 illustrates an example simplified procedure for reduced topology routing in a shared-media communication network in accordance with one or more embodiments described herein. The procedure 700 starts at step 705, and continues to step 710, where, as described in greater detail above, the network may optionally initialize the routing topology (e.g., DAG 410) using a chosen link metric (e.g., ETX) without regard to numbers of child nodes, and then in the steps below, may iteratively update the topology according to the techniques herein.

In particular, in step 715, a particular node, e.g., node 32 may determine a current path cost to a root node of the routing topology via a current parent node, e.g., node 22, and may also determine in step 720 a respective path cost from the particular node to the root node via each reachable potential parent (e.g., node 11, node 13, and the root node) and a respective link metric from the particular node to each potential parent node, as well. Based on an acceptable cost increase and acceptable link metric range determined in step 725, a set of acceptable parent nodes may be determined in step 730 that have a respective path cost that is less than the current path cost plus the acceptable cost increase, and that also have a respective link metric from the particular node that is within the acceptable link metric range, as described in detail above.

In step 735, the particular node determines, for each acceptable parent node of the set, a respective number of child nodes of the corresponding acceptable parent node, and may then select a new parent node for the particular node in step 740 based on giving preference to acceptable parent nodes having a greater respective number of child nodes (e.g., and based on capabilities), as detailed herein. The procedure 700 may then iteratively return to step 715 to compute new path costs, or to any other step, e.g., to directly determine updated child node counts, updated link metrics, etc.

Figure 8:
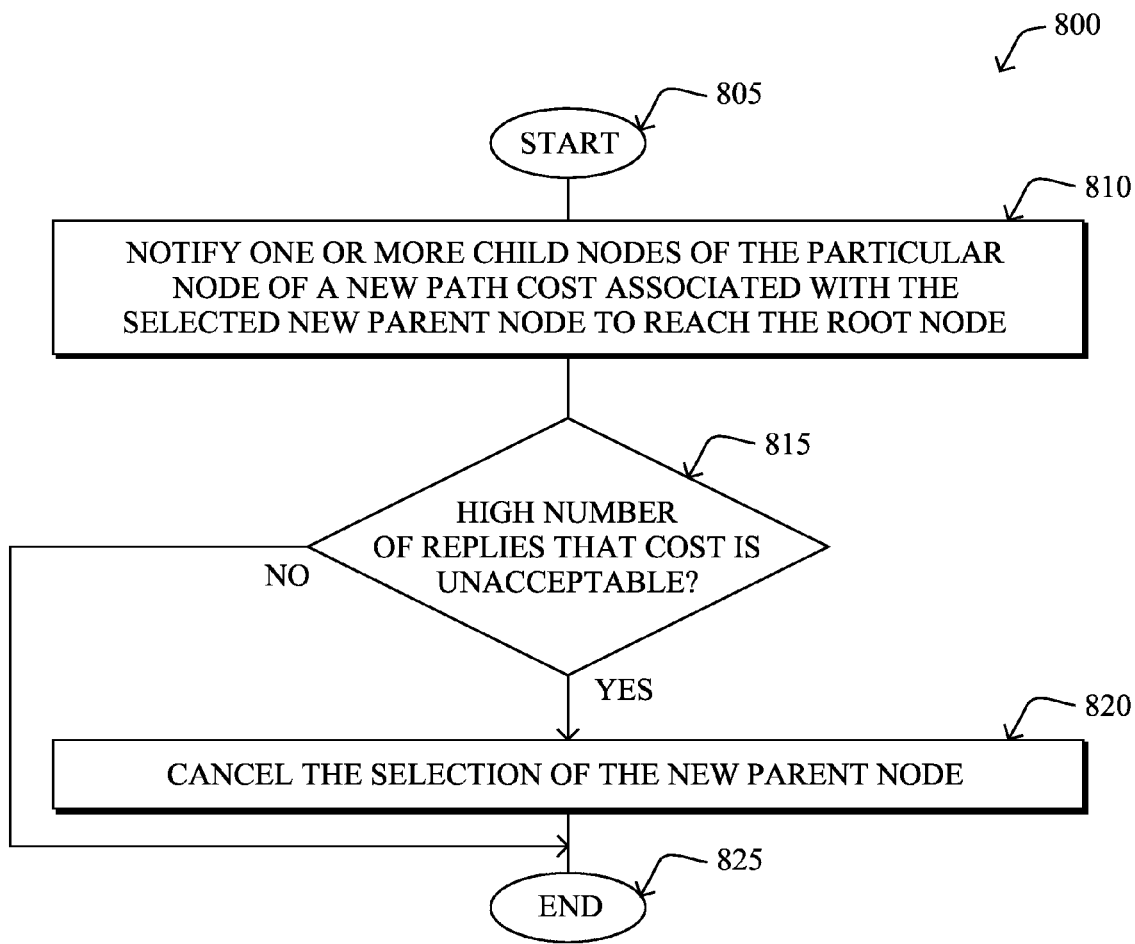
FIG. 8 illustrates another example simplified procedure for reduced topology routing in a shared-media communication network.

In addition, FIG. 8 illustrates another example simplified procedure for reduced topology routing in a shared-media communication network in accordance with one or more embodiments described herein. The procedure 800 starts at step 805, and continues to step 810, where the particular node notifies one or more of its child nodes (e.g., node 42 and 43) of a new path cost associated with the selected new parent node to reach the root node, and in step 815 determines whether there is too high a number of unacceptable replies. If so, then in step 820 the particular node cancels the selection of the new parent node, and the procedure 800 ends in step 825, e.g., returning to procedure 700 of FIG. 7 above to select a new parent node based on an updated acceptable cost increase.

Figure 9:
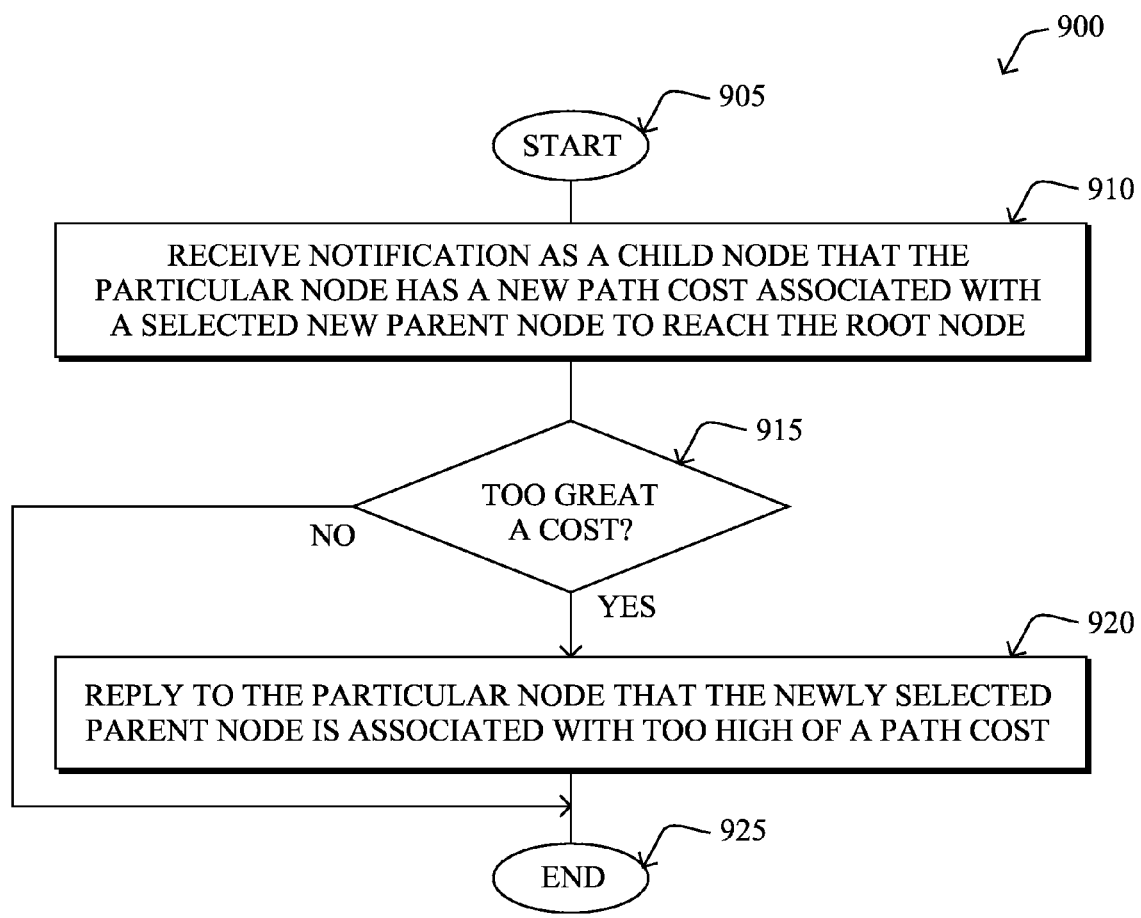
FIG. 9 illustrates another example simplified procedure for reduced topology routing in a shared-media communication network, e.g., from the perspective of a child node whose grandparent is potentially being reselected.

Further, FIG. 9 illustrates another example simplified procedure for reduced topology routing in a shared-media communication network in accordance with one or more embodiments described herein, e.g., from the perspective of a child node whose grandparent is potentially being reselected. The procedure 900 starts at step 905, and continues to step 910, where, in relation to procedure 800 of FIG. 8 above, a child node receives notification that the particular node has a new path cost associated with a selected new parent node to reach the root node. If the path cost is too great in step 915, then in step 920 the child node replies to the particular node that the newly selected parent node is associated with too high of a path cost, and the procedure 900 may then end in step 925.

Figure 10:
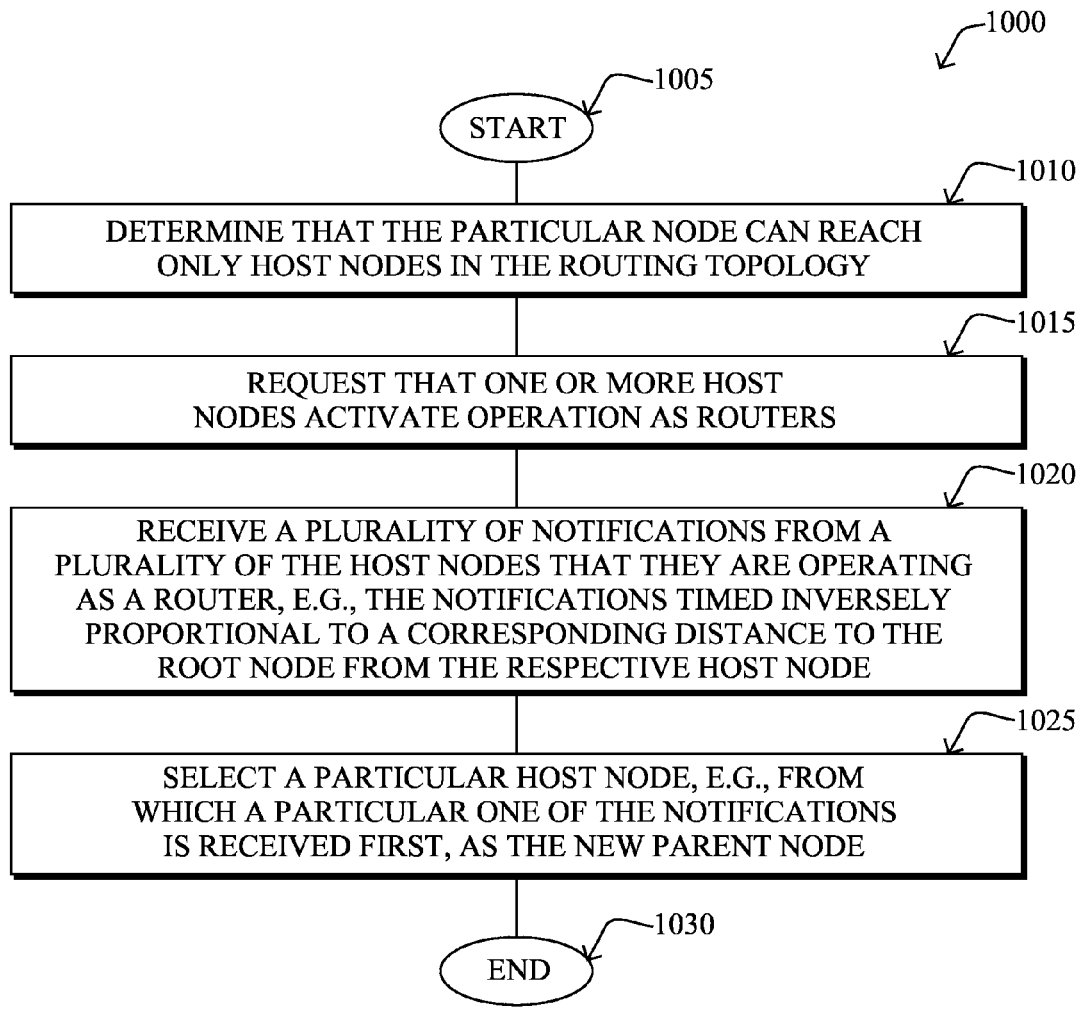
FIG. 10 illustrates another example simplified procedure for reduced topology routing in a shared-media communication network.

Moreover, in accordance with one or more embodiments mentioned above, FIG. 10 illustrates another example simplified procedure for reduced topology routing in a shared-media communication network. The procedure 1000 starts at step 1005, and continues to step 1010, where, as described in greater detail above, the particular node may determine that it can reach only host nodes in the routing topology. In response, in step 1015, the particular node can request that one or more host nodes activate operation as routers, and in step 1020 may receive a plurality of notifications from a plurality of the host nodes that they are operating as a router. As noted above, the notifications may be timed inversely proportional to a corresponding distance to the root node from the respective host node, and as such, the particular node may select a particular host node, e.g., from which a particular one of the notifications is received first, as the new parent node in step 1025, and the procedure 1000 ends in step 1030.

Figure 11:
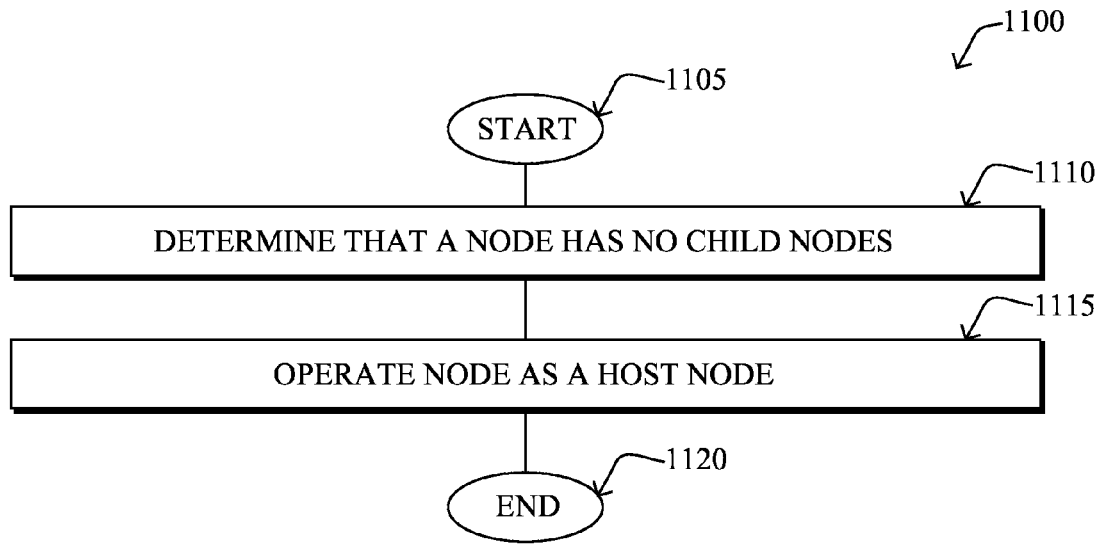
FIG. 11 illustrates another example simplified procedure for reduced topology routing in a shared-media communication network, e.g., from the perspective of a router/parent node.

FIG. 11 illustrates another example simplified procedure for reduced topology routing in a shared-media communication network in accordance with one or more embodiments described herein, e.g., from the perspective of a router/parent node. The procedure 1100 starts at step 1105, and continues to step 1110, where, as described in greater detail above, the router, e.g., node 22, determines that it has no child nodes, and as such, in step 1115, may begin operating as a host node. The procedure 1100 ends in step 1120.

Figure 12:
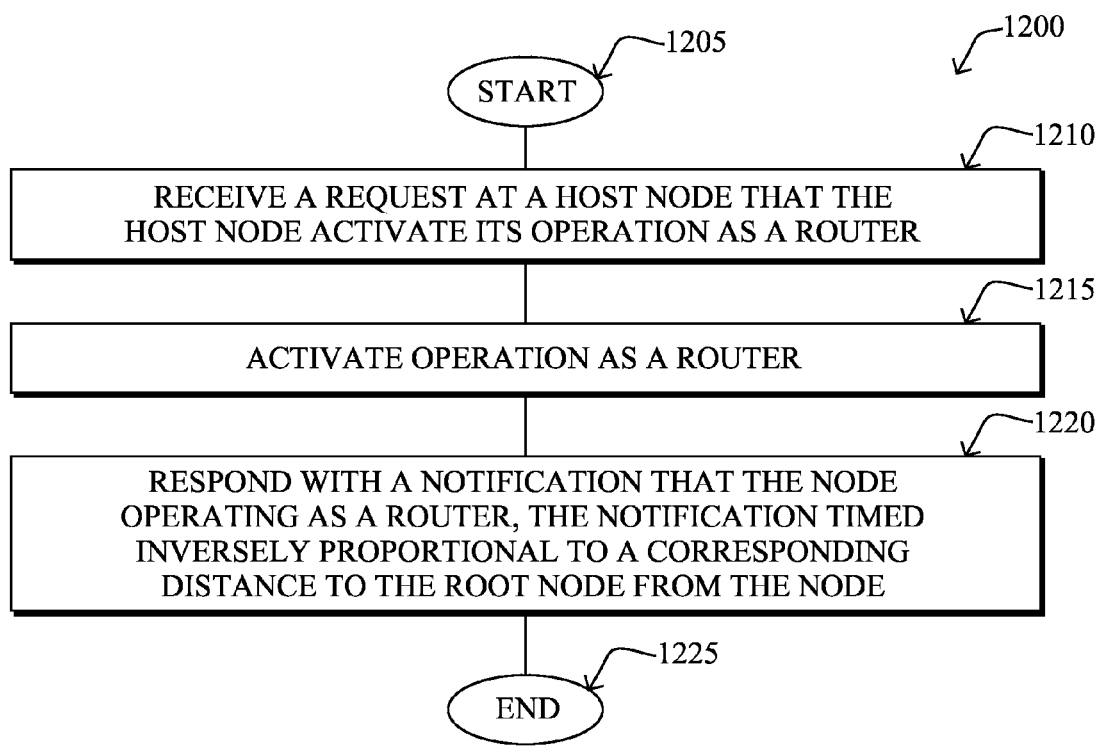
FIG. 12 illustrates an example simplified procedure for reduced topology routing in a shared-media communication network, e.g., from the perspective of a host node.

Conversely, FIG. 12 illustrates an example simplified procedure for reduced topology routing in a shared-media communication network in accordance with one or more embodiments described herein, e.g., from the perspective of a host node. The procedure 1200 starts at step 1205, and continues to step 1210, where, as described in greater detail above, the host node (e.g., node 22 after procedure 1100 of FIG. 11 above) receives a request that the host node activate its operation as a router. In response, the node may activate operation as a router in step 1215, and responds with a notification that the node is operating as a router. In particular, the notification may be timed inversely proportional to a corresponding distance to the root node from the node. The illustrative procedure 1200 ends in step 1225, where operation begins as a router. Note that if the router is not selected as a parent node, then the node may return to procedure 1100 of FIG. 11 to cease operation as a router. As an alternative, however, step 1215 may occur only after receiving acknowledgment from the child node that the host node has been selected as the parent node.

It should be noted that while certain steps within procedures 700-1200 may be optional as described above, the steps shown in FIGS. 7-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-1200 are described separately, certain steps from each procedure may be incorporated into each other procedure, and the procedures are not meant to be mutually exclusive.

Note also that at any time, the network may re-optimize itself, e.g., by running the DAG formation without trying reduce the number of nodes, given the possibility of nodes newly becoming hosts and/or routers as described herein. From there, the network may reapply the processes described above, e.g., to again search for reduced topology opportunities. In this manner, the system may avoid diverging too far from the optimal topology in terms of path cost.

The novel techniques described herein, therefore, provide for reduced topology routing in shared media communication networks. By selecting next-hops that provide an "acceptable" path to the destination, while reducing the number of active routers in the network, end-to-end latencies may be reduced, energy may be saved (saving batteries), and network collisions in the network may be lessened (thus increasing the available bandwidth for applications, reducing even more latencies in the network, etc.). In addition, the techniques herein minimize the amount of routing control packets sent over the shared medium, further reducing packet collisions and increasing network efficiency.

Note that by limiting the number of routers in the network, the techniques also prevent excessive traffic in the network from repeated broadcast and multicast messages that would be otherwise duplicated at a receiving child node. In other words, the techniques herein may be used to reduce the number of duplicate packets which need to be processed by the various nodes, thus reducing the wasted resources which are required for transmitting the messages by a first node, receiving the duplicate packets (at times hundreds of them) by a second node, comparing the IDs of the received packet with IDs of packets previously received, and discarding the duplicate packets once they have been identified as such.

While there have been shown and described illustrative embodiments that provide for reduced topology routing in shared media communication networks, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not as limited, and may, in fact, be used with other types of networks and/or protocols (e.g., various distance vector protocols). Also, while the techniques described above generally reference wireless communication, other shared media (e.g., PLC) may be used.

Note also that while the embodiments described above may have been assumed to describe recursive phases, where all the nodes make a change, then all the nodes react to all of the previous changes, etc., in practice, it is more likely that the process will be distributed and many steps will be executed in parallel by various nodes, such that one node may make a parent selection, and another node may hear about this selection (e.g., before making its own decision), and that other node may then base its decision on the completed selection. The description above is therefore not meant to limit the embodiments herein.

In addition, while the embodiments above are generally directed to using the techniques for a primary DAG for all traffic, the techniques herein may be used to establish secondary DAGs/topologies that may be used for specific types of traffic, e.g., multicast and broadcast messages.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining a current path cost in a routing topology from a particular node in a shared media communication network to a root node of the routing topology via a current parent node;
    determining, for each reachable potential parent node of the particular node, a respective path cost from the particular node to the root node via each potential parent and a respective link metric from the particular node to each potential parent node;
    determining a set of acceptable parent nodes selected from the potential parent nodes, wherein acceptable parent nodes have a respective path cost that is less than the current path cost plus a cost increase, and also have a respective link metric from the particular node that is within a link metric range;
    determining, for each acceptable parent node of the set, a respective number of child nodes of the corresponding acceptable parent node; and
    selecting a new parent node for the particular node in the routing topology based on giving preference to acceptable parent nodes having a greater respective number of child nodes.

2. The method as in claim 1, wherein selecting the new parent node comprises:
    selecting an acceptable parent node having the greatest number of child nodes.

3. The method as in claim 1, further comprising:
    iteratively updating parent node selection based on updates to the routing topology.

4. The method as in claim 1, further comprising:
    initializing the routing topology using the link metric without regard to numbers of child nodes; and
    updating parent node selection by the selecting of the new parent node for the particular node in the routing topology based on giving preference to acceptable parent nodes having a greater respective number of child nodes.

5. The method as in claim 1, further comprising:
    determining at least one of either the cost increase and the link metric range from a centralized management device.

6. The method as in claim 1, further comprising:
    determining at least one of either the cost increase and the link metric range locally and dynamically by the particular node.

7. The method as in claim 6, wherein determining the cost increase locally and dynamically comprises:
    determining the cost increase based on one or more factors selected form a group consisting of: a number of neighbors of the particular node; a number of children of the particular node; and dynamic link characteristics of the particular node.

8. The method as in claim 1, wherein the link metric is selected from a group consisting of: expected transmission count (ETX); delay; and packet loss.

9. The method as in claim 1, wherein a respective number of child nodes of a particular corresponding acceptable parent node is based on phantom nodes to weight the preference of the particular acceptable parent node.

10. The method as in claim 1, wherein selecting the new parent node comprises:
    giving preference to acceptable parent nodes based on one or more capabilities of the acceptable parent nodes.

11. The method as in claim 10, wherein the one or more capabilities are selected from a group consisting of: being powered by main-power; having sufficient battery power remaining; being capable of performing data aggregation; having sufficient processing capacity; and having sufficient available memory.

12. The method as in claim 1, further comprising:
    notifying one or more child nodes of the particular node of a new path cost associated with the selected new parent node to reach the root node; and
    in response to receiving more than a threshold amount of replies from the child nodes indicating that the new path cost is unacceptable, canceling the selection of the new parent node.

13. The method as in claim 1, further comprising:
    determining that the particular node can reach only host nodes in the routing topology; and in response to determining that the particular node can reach only host nodes in the routing topology, requesting that one or more host nodes activate operation as routers.

14. The method as in claim 13, further comprising:
    receiving a plurality of notifications from a plurality of the host nodes that they are requested to operate as a router, the notifications timed inversely proportional to a corresponding distance to the root node from the respective host node; and
    in response, selecting a particular host node from which a particular one of the notifications is received first as the new parent node.

15. An apparatus, comprising:
    one or more network interfaces to communicate within a shared media communication network;
    a processor coupled to the network interfaces and adapted to execute one or more processes; and
    a memory configured to store a process executable by the processor, the process when executed operable to:
    determine a current path cost in a routing topology from the apparatus to a root node of the routing topology via a current parent node;
    determine, for each reachable potential parent node of the apparatus, a respective path cost from the apparatus to the root node via each potential parent and a respective link metric from the apparatus to each potential parent node;

determine a set of acceptable parent nodes selected from the potential parent nodes, wherein acceptable parent nodes have a respective path cost that is less than the current path cost plus a cost increase, and also have a respective link metric from the apparatus that is within a link metric range;

determine, for each acceptable parent node of the set, a respective number of child nodes of the corresponding acceptable parent node; and select a new parent node for the apparatus in the routing topology based on giving preference to acceptable parent nodes having a greater respective number of child nodes.

16. The apparatus as in claim 15, wherein the process when executed to select the new parent node is further operable to:
select an acceptable parent node having the greatest number of child nodes.

17. The apparatus as in claim 15, wherein the process when executed is further operable to:
initialize the routing topology using the link metric without regard to numbers of child nodes; and
update parent node selection by the selection of the new parent node for the apparatus in the routing topology based on giving preference to acceptable parent nodes having a greater respective number of child nodes.

18. The apparatus as in claim 15, wherein the process when executed is further operable to:
determine at least one of either the cost increase and the link metric range from a centralized management device.

19. The apparatus as in claim 15, wherein the process when executed is further operable to:
determine at least one of either the cost increase and the link metric range locally and dynamically.

20. The apparatus as in claim 15, wherein the link metric is selected from a group consisting of: expected transmission count (ETX); delay; and packet loss.

21. The apparatus as in claim 15, wherein the process when executed to select the new parent node is further operable to:
give preference to acceptable parent nodes based on one or more capabilities of the acceptable parent nodes.

22. The apparatus as in claim 15, wherein the process when executed is further operable to:
notify one or more child nodes of the apparatus of a new path cost associated with the selected new parent node to reach the root node; and
in response to receiving more than a threshold amount of replies from the child nodes indicating that the new path cost is unacceptable, cancel the selection of the new parent node.

23. The apparatus as in claim 15, wherein the process when executed is further operable to:
determine that the apparatus can reach only host nodes in the routing topology; and in response to determining that the apparatus can reach only host nodes in the routing topology, request that one or more host nodes activate operation as routers.

24. A tangible, non-transitory, computer-readable media having software encoded thereon, the software, when executed by a processor on a particular node in a shared media communication network, operable to:

determine a current path cost in a routing topology from the particular node to a root node of the routing topology via a current parent node;

determine, for each reachable potential parent node of the particular node, a respective path cost from the particular node to the root node via each potential parent and a respective link metric from the particular node to each potential parent node;

determine a set of acceptable parent nodes selected from the potential parent nodes, wherein acceptable parent nodes have a respective path cost that is less than the current path cost plus a cost increase, and also have a respective link metric from the particular node that is within a link metric range;

determine, for each acceptable parent node of the set, a respective number of child nodes of the corresponding acceptable parent node; and select a new parent node for the particular node in the routing topology based on giving preference to acceptable parent nodes having a greater respective number of child nodes.

* * * * *